（12）United States Patent
Shimizu et al.

(10) Patent No.: US 9,187,203 B2
(45) Date of Patent: Nov. 17, 2015

(54) POLYESTER RESIN CONTAINER AND MOLDING PROCESS THEREOF

(75) Inventors: Kazuhiko Shimizu, Chiba (JP); Toshimasa Tanaka, Tokyo (JP); Takao Iizuka, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 429 days.

(21) Appl. No.: 13/457,289

(22) Filed: Apr. 26, 2012

(65) Prior Publication Data

US 2012/0288657 A1　Nov. 15, 2012

Related U.S. Application Data

(62) Division of application No. 11/921,953, filed as application No. PCT/JP2006/311978 on Jun. 15, 2006, now Pat. No. 8,409,490.

(30) Foreign Application Priority Data

Jun. 29, 2005　(JP) .................................. 2005-189998
Jul. 22, 2005　(JP) .................................. 2005-213068
Jul. 29, 2005　(JP) .................................. 2005-220253

(51) Int. Cl.
　　B32B 27/08　　(2006.01)
　　B65D 1/02　　(2006.01)
(Continued)

(52) U.S. Cl.
　　CPC ............. B65D 1/0223 (2013.01); B29C 49/649 (2013.01); B65D 1/0276 (2013.01);
(Continued)

(58) Field of Classification Search
　　CPC .......... B65D 1/00; B65D 23/00; B65D 39/00; B65D 57/00; B29C 49/18; B32B 1/02
　　USPC ............... 426/106, 112, 117, 115; 428/36.92; 264/512, 513, 516
See application file for complete search history.

(56) References Cited

U.S. PATENT DOCUMENTS 4,385,089 A　5/1983　Bonnebat et al.
4,439,394 A　3/1984　Appleyard
(Continued)

FOREIGN PATENT DOCUMENTS

JP　　B2-07-067732　　7/1995
JP　　A-2002-338667　　11/2002

OTHER PUBLICATIONS

Office Action issued in U.S. Appl. No. 11/921,953; mailed May 3, 2012.

Primary Examiner — Preston Smith
(74) Attorney, Agent, or Firm — Oliff PLC (57) ABSTRACT

The technical problem to be solved by this invention is to develop a polyester resin container that can be retort-processed at a temperature in the range of above 120° C. to about 130° C. The object of this invention is to provide a polyester resin container, which is capable of improving the productivity and quality of retort foods, and a molding process thereof. The process of this invention is a double blow molding process, which comprises a primary blow molding step in which a preform is biaxially drawn and blow molded into a primary intermediate product, a thermally shrink-molding step in which the primary intermediate product is heated and forcibly shrink-molded into a secondary intermediate product, and a secondary blow molding step for blow molding the secondary intermediate product into a container, wherein a mold temperature higher than 210° C. is used in the secondary blow molding step.

2 Claims, 7 Drawing Sheets

(51) Int. Cl.
*B29C 49/64* (2006.01)
*B29C 49/06* (2006.01)
*B29K 67/00* (2006.01)

(52) U.S. Cl.
CPC . *B29B2911/1402* (2013.01); *B29B 2911/1404* (2013.01); *B29B 2911/1408* (2013.01); *B29B 2911/1412* (2013.01); *B29B 2911/14026* (2013.01); *B29B 2911/14033* (2013.01); *B29B 2911/14053* (2013.01); *B29B 2911/14066* (2013.01); *B29B 2911/14093* (2013.01); *B29B 2911/14106* (2013.01); *B29B 2911/14126* (2013.01); *B29B 2911/14133* (2013.01); *B29B 2911/14146* (2013.01); *B29B 2911/14153* (2013.01); *B29C 49/06* (2013.01); *B29K 2067/00* (2013.01); *Y10T 428/1352* (2015.01); *Y10T 428/1397* (2015.01)

(56) References Cited

U.S. PATENT DOCUMENTS

| | | |
|---|---|---|
| 5,145,632 A | 9/1992 | Denis et al. |
| 5,277,574 A | 1/1994 | Denis et al. |
| 5,445,515 A | 8/1995 | Orimoto et al. |
| 5,611,987 A | 3/1997 | Kato et al. |
| 5,735,420 A * | 4/1998 | Nakamaki et al. ............ 215/373 |
| 5,785,921 A | 7/1998 | Outreman et al. |
| 5,928,742 A | 7/1999 | Sugiura et al. |
| 7,051,890 B2 | 5/2006 | Onoda et al. |
| 7,083,407 B2 | 8/2006 | Seki et al. |
| 7,459,119 B2 | 12/2008 | Ota et al. |
| 2002/0048642 A1* | 4/2002 | Beck ............................ 428/35.7 |
| 2004/0262817 A1 | 12/2004 | Uesugi et al. |
| 2006/0110555 A1 | 5/2006 | Asai et al. |

* cited by examiner

POLYESTER RESIN CONTAINER AND MOLDING PROCESS THEREOF

This is a Division of application Ser. No. 11/921,953 filed Feb. 9, 2009, which is a National Phase of Application No. PCT/JP2006/311978 filed Jun. 15, 2006, which claims benefit of Japanese Patent Applications Nos. 2005-189998 filed Jun. 29, 2005, 2005-213068 filed Jul. 22, 2005 and 2005-220253 filed Jul. 29, 2005. The disclosure of the prior applications is hereby incorporated by reference herein in its entirety.

TECHNICAL FIELD

This invention relates to a polyester resin container to be used in the applications requiring retort processing, and to a process for molding such a container.

In recent years, biaxially drawn, blow molded containers made of polyester resins, such as polyethylene terephthalate resins (hereinafter referred to as PET resins) have been much in use in the applications for those foods requiring retort processing.

However, in the case of conventional polyester containers that have been biaxially drawn and blow molded, there occurred unavoidable shrinkage in the containers due to residual distortion caused by the deformation in the process of drawing when the containers were retort-processed at a temperature as high as about 120° C. Such shrinkage gave damage to appearance, and the containers could not be used as finished products. Later, various sorts of development were under way for the purpose of increasing heat resisting property of the PET resin containers. As one of the effective molding processes, what is called the "double blow molding process" was developed by the same applicant as that of this invention (See Patent Document 1). This process is now in use as a process for molding those containers to be retort-processed at a temperature of 120° C. for about 30 minutes.

This double blow molding process comprises a primary blow molding step where a preform previously molded into a desired shape is biaxially drawn and blow molded into a primary intermediate product, a thermally shrink-molding step where the primary intermediate product is thermally shrunk and molded into a secondary intermediate product, and finally, a secondary blow molding step where the secondary intermediate product is molded into a final container product. Residual distortion that has been generated in the primary intermediate product can be eliminated by heating and thermally shrinking the primary intermediate product, without decreasing the degree of crystallization that has been promoted by the drawing. Thus, a bottle with high heat resistance can be obtained.

[Patent Document 1] Published patent Application JP1995-67732 A

In the meantime, with the progress in the utilization of PET resin containers for retort processing applications, the PET resin containers have also become widely recognized in the field of retort foods for their low cost, convenience, and merchantability. As a result, there has been a growing need to utilize these containers for the contents that require sterilization treatment under severer conditions. For instance, soup products require a condition of processing at 120° C. for about 60 minutes. If the processing temperature can be further increased, it is possible for the processing period to be shortened to a large extent. Since high-temperature processing for a short period causes the contents to become less subject to thermal deterioration, those containers having a higher heat resisting property are requested from both aspects of productivity and product quality.

DISCLOSURE OF THE INVENTION

Problems to be Solved by the Invention

The technical problem to be solved by this invention is to develop a polyester resin container that can be retort-processed at a temperature in the range of above 120° C. to about 130° C. The object of this invention is to provide a polyester resin container, which is capable of improving productivity and quality of retort foods, and a molding process thereof.

Means of Solving the Problem

The invention described herein relates to a double blow molding process for molding a polyester resin container. The process of this invention comprises a primary blow molding step in which a preform is biaxially drawn and blow molded into a primary intermediate product, a thermally shrink-molding step in which the primary intermediate product is heated and forcibly shrink-molded into a secondary intermediate product, and a secondary blow molding step for blow molding the secondary intermediate product into a container, wherein the process is characterized in that a mold temperature higher than 210° C. is used in the secondary blow molding step.

In the case where a mold temperature of 210° C. or less is used in the secondary blow molding step, the double blow molded polyester resin containers would be disfigured, thus failing to have a good shape required for a product, when the containers were retort-processed at a high temperature ranging from above 120° C. to about 130° C. In order to achieve an increased heat set effect that can be observed at a high mold temperature during the secondary blow molding step, the inventors of this invention conducted a container-molding test by raising the mold temperature up to near 250° C. where the secondary intermediate product made of a PET resin began to melt. The test revealed that a mold temperature of up to 230° C. had no large problem in mold ability and gave no thick haze associated with whitening of the container after the molding operation. After the retort processing in the temperature range of 120° C. to 130° C., container deformation into a shrunk state was controlled to an extent to which no container was damaged in appearance. The inventors have found that the containers could be fully marketable as finished products, and this fact led them to make this invention.

When a mold temperature higher than 210° C. is used in the above-described double blow molding process, there can be provided a polyester resin container, which gives no damage especially to moldability, reduces the shrinking deformation to a level small enough to keep the container in a good shape even in the retort processing at a temperature in the range of above 120° C. to about 130° C., and does not impair transparency in those transparent containers such as PET resin containers.

Polyester resins for use in this invention comprise those polyester resins which can be biaxially drawn and blow molded and can also be subjected to crystallization, and include, for example, a PET resin, a polybutylene terephthalate resin, a polyethylene naphthalate (PEN) resin, and the like. Also usable are the blends of these polyester resins, and the blends of a major part of these polyester resins with a polyolefin resin, a polycarbonate resin, an allylate resin, or a nylon resin.

Unless essential qualities are impaired, the polyester resin container of this invention may have a laminated structure for all or part of body wall. For instance, the body wall may have a laminated structure comprising PET-nylon-PET layers for the purpose of improving a gas barrier property and PET-PEN-PET layers for adjusting the balance between heat-resisting property and moldability. Carbon film or silicon oxide film can also be laminated by a plasma CVD process on the inner wall surface to improve the gas barrier property.

The process of this invention may also comprise using a mold temperature of 215° C. or higher in the secondary blow molding process.

According to the above-described process, it is preferred that a mold temperature of 215° C. or higher is used in the secondary blow molding process. In this way, shrinkage in volume after retort processing can be controlled to a fully low level, and a product yield ratio of nearly 100% can be achieved.

The process of this invention may also comprise useing a resin of a PET series as a polyester resin, According to the construction discussed above it is preferred to use a PET resin having the lowest material cost among the polyester resins and also having a high biaxial drawing and blow molding property.

PET is mainly used in this invention as the resin of PET series. Unless essential qualities of PET resins are impaired, there can be used those copolymerized polyesters comprising a major part of ethylene terephthalate units and other polyester units. For example, a nylon resin, a polyethylene naphthalate resin, and the like can be blended with PET to improve the heat resisting property. As the ingredients for forming copolymerized polyesters, there can be mentioned dicarboxylic acid ingredients, such as isophthalic acid, naphthalene-2,6-dicarboxylic acid, and adipic acid; and glycol ingredients, such as propylene glycol, 1,4-butanediol, tetramethylene glycol, neopentyl glycol, cyclohexane dimethanol, and diethylene glycol.

Also described herein is a polyester resin container. The means of carrying out the invention may also comprise that the retort processing of a polyester resin container at 124° C. for 42 minutes gives a volume shrinkage ratio of 0.75% or less.

The inventors were led to this invention when they discovered that because of the heat set effect caused by a high mold temperature to be used especially in the secondary blow molding step, the double blow molded polyester resin containers can have a very small volume shrinkage ratio even in the retort processing at a temperature of 120-130° C. Furthermore, at a volume shrinkage ratio of 0.75% or less, which is obtained by the retort processing at 124° C. for 42 min, there can be provided a container that can be retort-processed at a temperature ranging from above 120° C. to about 130° C., without letting local deformation impair the shape of the container. The retort processing conditions of 124° C. and 42 min have a sterilization effect equivalent to soup processing at 120° C. for 60 min.

If the volume shrinkage ratio exceeds 0.75%, there is a high tendency for the container shape to be impaired after the retort processing. At a volume shrinkage ratio above 2%, the shape of the container is impaired at almost a hundred percent, and the container no longer can be dealt with as a product.

The means of carrying out the invention may also comprise that, a polyethylene terephthalate resin is used as the polyester resin.

For the polyethylen terephalate resin described above, it is preferred to utilize a PET resin which has the lowest material cost among polyester resins and has a high biaxial drawing and blow molding property.

Effects of the Invention

This invention having above-described construction has the following effects:

When a mold temperature higher than 210° C. is used in the above-described double blow molding of this invention, there can be provided a polyester resin container, which gives no damage especially to moldability, reduces the shrinking deformation to a level small enough to keep the container in a good shape even in the retort processing at a temperature in the range of above 120° C. to about 130° C., and does not impair transparency in those transparent containers such as PET resin containers.

In the invention, a mold temperature of 215° C. or higher may be used in the secondary blow molding process. Thus, the volume shrinkage after retort processing can be controlled to a fully low level, and product yield ratio can be improved.

In the invention, it is preferred to use a PET resin having the lowest material cost among the polyester resins and also having a high biaxial drawing and blow molding property.

If in the invention, use is made of a volume shrinkage ratio of 0.75% or less which is obtained by the retort processing at 124° C. for 42 min., there can be provided a container that can be retort-processed at a temperature ranging from above 120° C. to about 130° C., without letting local deformation impair the shape of the container.

In the invention, it is preferred to utilize a PET resin which has the lowest material cost among polyester resins and also has a high biaxial drawing and blow molding property.

BRIEF DESCRIPTION OF THE DRAWINGS

FIGS. 4($a$) and 4($b$) are cross-sectional outlines taken from line A-A and line B-B, respectively, of the bottle of FIG. 3.

FIG. 6($a$) is a vertical outline in the vicinity of the bottom, and FIG. 6($b$), a bottom plan view, of the bottle of FIG. 3.

EXPLANATION OF CODES

1. Bottle (Container)
2. Neck
3. Shoulder
4. Body
5. Bottom
5$a$. Central concave portion
6. Vacuum-absorbing panel
7. Pillar
8. Circular section
11. Preform 21. Primary intermediate product
31. Secondary intermediate product
106. Panel
106a. Dented panel portion
106b. Raised panel portion
107. Pillar
109. Peripheral-stepped portion
110. Stepped portion
111. Boundary
115. Swollen state
115a. Swollen and reversed state
115b. Swollen and deformed state
116. Dented state
116a. Dented and deformed state
116b. Dented and reversed state
121. Bottom plane
122. Heel portion
123. Grounding bottom rim portion
124. Central concave portion
125. Top area
R1, R2. Radius of curvature
H1. Height of the central concave portion
D1. Maximum outer diameter of the heel portion
D2. Outer diameter of the grounding bottom rim portion
Tre. Retort autoclave temperature
Pre. Retort autoclave pressure
Pb. Pressure inside the bottle

PREFERRED EMBODIMENTS OF THE INVENTION

Figure 1:
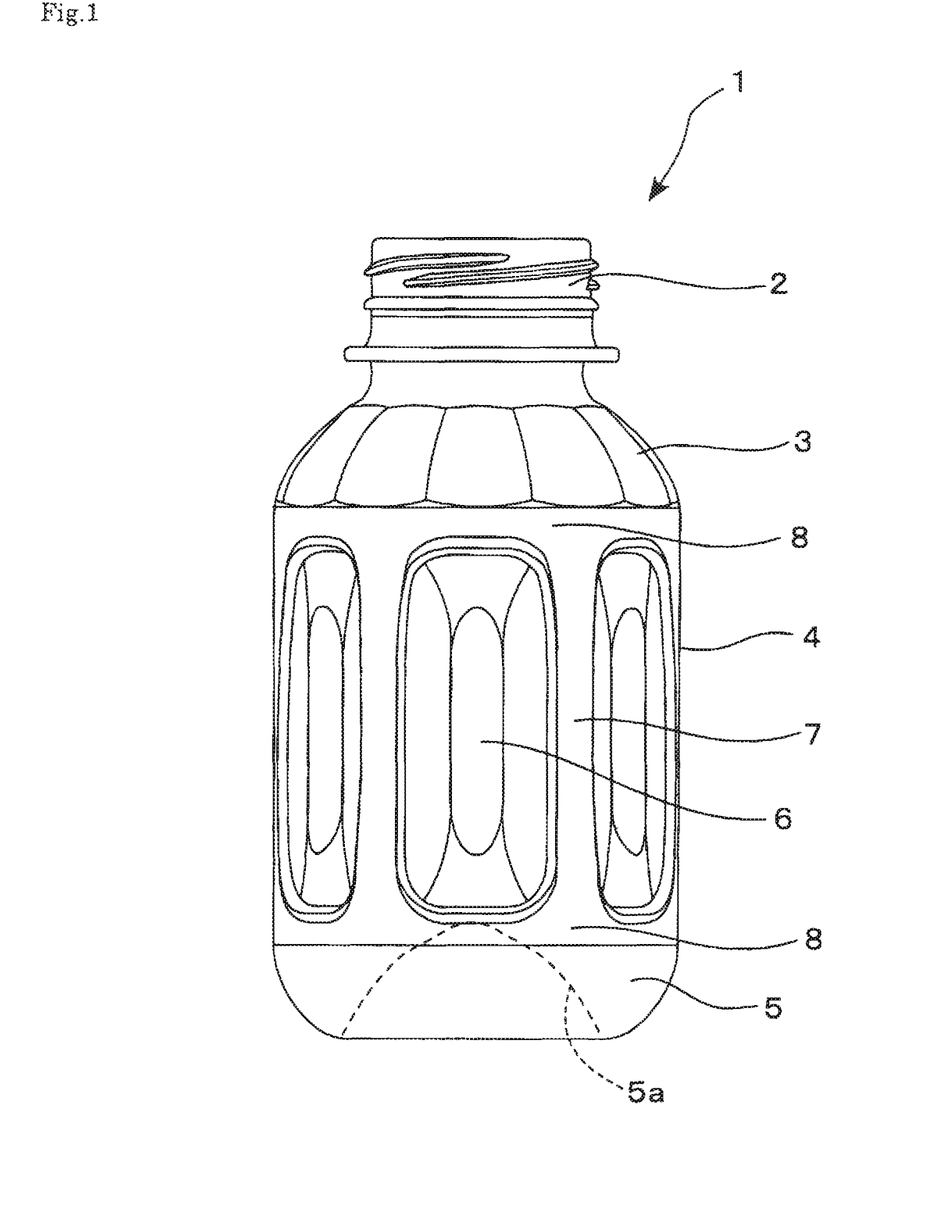
FIG. 1 is a front elevational view of the entire bottle in the first embodiment of this invention.

This invention is further described with respect to preferred embodiments, now referring to the drawings. It is to be noted here that this invention should not be construed as limitative to the description of these embodiments. FIG. 1 is a front elevational view of a bottle 1 in one embodiment of the polyester container of this invention. The bottle 1 is made of a PET resin, and was molded by the double blow molding process which will be described later. It is a round bottle having a height of 130 mm and a body diameter of 66 mm and comprising a neck 2, a shoulder 3, a cylindrical body 4, and a bottom 5. The neck has been thermally crystallized to a whitened state, and a central concave portion 5a is formed inside the bottom 5.

Six vacuum-absorbing panels 6 are formed in the wall of the body 4 and are disposed in parallel at longitudinal positions by gently denting the body wall except for upper and lower areas of the body 4. Vertical rib-like pillars 7 are formed between two adjacent vacuum-absorbing panels 6 while leaving the pillars 7 in the undented state. And circular sections 8 in a short cylindrical shape are formed in the upper and lower areas of the body 4, likewise in the undented state. Rigidity of the entire bottle 1 is secured mainly by these pillars 7 and circular sections 8. If the vacuum-absorbing panels 6 of the body 4 are reversed and deformed into a swollen state at a high temperature during retort processing, the circular sections in the upper and lower areas of the body fulfill a function for confining the swelling deformation of the bottle 1 to a certain limit.

Figure 2:
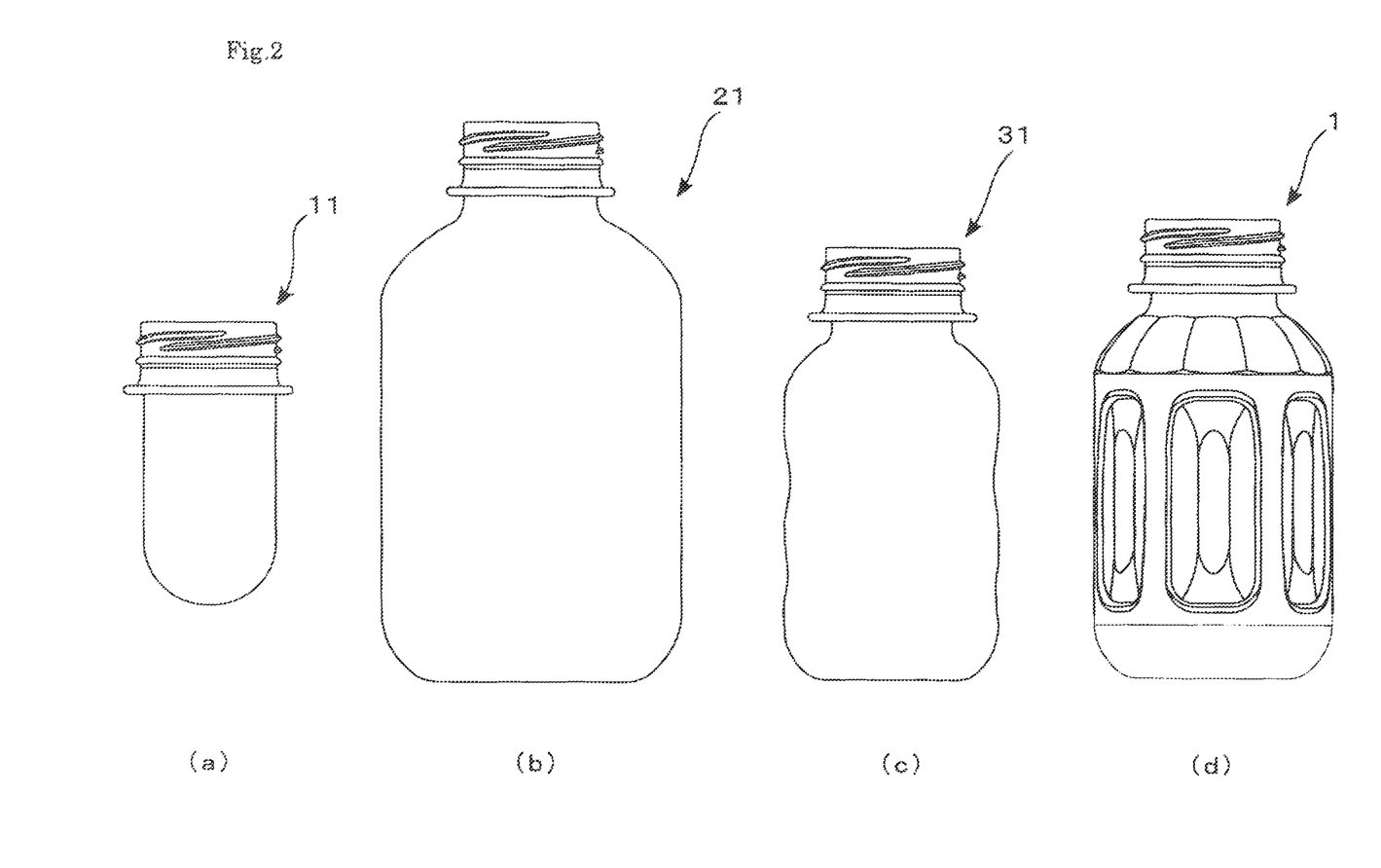
FIG. 2 is an explanatory diagram showing front views of a preform and the molded products obtained respectively from the steps of the double blow molding process of this invention.

The double blow molding process for molding the bottle 1 is described, now referring to FIG. 2, which is an explanatory diagram showing the front views of a preform and the molded products from respective process steps. Essentially, the double blow molding process comprises a primary blow molding step in which a preform 11 (FIG. 2a) is biaxially drawn and blow molded into a primary intermediate 21, a thermally shrink-molding step in which this primary intermediate product 21 is heated and forcibly shrink-molded into a secondary intermediate product 31, and a secondary blow molding step for blow molding the secondary intermediate product 31 into a container 1.

Each step is described in more details below.

1) Primary Blow Molding Step

Preform 1 injection-molded in the shape of a test tube is heated to a temperature ranging from 70° C., where a drawing effect is available, to 130° C., a temperature just before thermal crystallization of the PET resin begins, and preferably to a temperature in the range of 90° C. to 120° C. At that time, the mold temperature is set at a temperature in the range of 50° C. to 230° C., preferably 70° C. to 180° C., and the primary intermediate product 21 is molded by the biaxial drawing and blow molding process (FIG. 2b).

2) Thermally Shrink-Molding Step

The above-described primary intermediate product 21 is heated to a temperature ranging from 110° C. close to the crystallization temperature for the PET resin to 250° C. where the extent of softening of the PET resin is so large that it is difficult to maintain the bottle shape, and preferably to a temperature in the range of 130° C. to 200° C. In this step, the primary intermediate product 21 is thermally shrunk and deformed to give a secondary intermediate product 31 (See FIG. 2c). Residual stress from the biaxial drawing and blow molding in the primary blow molding step is eased up in this step.

3) Secondary Blow Molding Step

The above-described secondary intermediate product 31 is molded into the bottle 1 by the blow molding process (FIG. 2d). In this step, the mold temperature is appropriately set at a level below 250° C., at which the PET resin is softened too largely to maintain the shape, while taking into consideration the maximum temperature to be used in, for example, retort processing of the bottle 1, the finished product.

EXAMPLES

The bottles 1 of FIG. 1 were molded by the double blow molding process, using the PET resin under the conditions described below to obtain the bottles 1 in examples 1-4 and comparative examples 1 and 2. The preform 11, the primary intermediate product 21, the secondary intermediate product 31, and the bottle 1 are in the shapes shown in (a), (b), (c), and (d) of FIG. 2.

(1) Primary Blow Molding Step

A preform heating temperature of 115° C., a mold temperature of 170° C., a vertical draw ratio of 2.5 times, and a lateral draw ratio of 3.0 times.

(2) Thermally Shrink-Molding Step

A heating temperature of 200° C. (a temperature on the surfaces of molded products) and a heating time of 50 sec.

(3) Secondary Blow Molding Step

A mold temperature in the range of 170° C.-230° C., a holding time of 2.8 sec, and an air circulation time of 0.8 sec.

As shown in Table 1, the bottles of examples 1-4 were obtained by using mold temperatures of 215° C., 220° C., 225° C., and 230° C., respectively, in the secondary blow molding step. The bottles of comparative examples 1 and 2 were obtained at the mold temperatures of 170° C. and 210° C., respectively.

Under the above-described conditions, the bottles of examples and comparative examples were molded by the double blow molding process. The bottles thus obtained were then filled with hot water at a high temperature of 90° C., were sealed with a cap, and were retort-processed by a steam heating method at 124° C. for 42 min. Each bottle was measured for the volume shrinkage ratio and haze, and bottle shape was evaluated. The results are as shown in Table 1 [in average values (n=10) for the volume shrinkage ratio and the haze]. The volume shrinkage ratios, in %, were calculated from a formula:

(Volume before processing−Volume after processing)/
Volume before processing

Bottle shape was checked for existence or nonexistence of partial dents or other types of deformation, and were rated as to whether they can be used as products. By an indication of 10/10 OK, it is meant that all the 10 bottles are usable as products. By an indication of 2/10 NG, it is meant that two out of 10 bottles are not usable because of damaged appearance.

TABLE 1

| Example | Mold temperature in secondary blow molding, °C. | Volume shrinkage ratio, % | Appearance check after processing | Haze, % Before processing | Haze, % After processing |
|---|---|---|---|---|---|
| Example 1 | 215 | 0.62 | 10/10 OK | 22 | 20 |
| Example 2 | 220 | 0.45 | 10/10 OK | 18 | 17 |
| Example 3 | 225 | 0.29 | 10/10 OK | 17 | 19 |
| Example 4 | 230 | 0.26 | 10/10 OK | 20 | 19 |
| Comparative example 1 | 170 | 3.06 | 10/10 NG | 17 | 18 |
| Comparative example 2 | 210 | 0.78 | 2/10 NG | 19 | 20 |

From the results in Table 1 it was found that, in examples 1 to 4 using a mold temperature of 215° C. or higher in the secondary blow molding step, all the bottles had satisfactory outer appearance after retort processing. On the other hand, results of comparative examples showed that, in the comparative example 1 using a mold temperature of 170° C., all the 10 bottles were no good in outer appearance and that, in the comparable example 2 using a mold temperature of 210° C., two out of ten bottles were no good. The result of comparative example 1 is out of the question. The result of comparative example 2 is unsatisfactory from a point of view of product yield. These results indicated that at a mold temperature of 210° C. or lower, bottles obtained cannot be used in the retort processing at a temperature in excess of 120° C. A main cause of defective bottles turned out to be cave-in deformation of body wall into a bending state.

It is found from Table 1 that the higher the mold temperature is, the lower the volume shrinkage ratio becomes. Also from a comparison of the ratio with bottle shape, it is found that when a volume shrinkage ratio of 0.75% or less is used, the bottles keep good shape and wear well after the retort processing at a temperature ranging from above 120° C. to about 130° C.

Haze was measured to evaluate transparency of bottles. Its relationship with the mold temperature in the secondary blow molding step was not clear. However, haze level was only 20% at the most, and the change was slight before and after the retort processing. Thus, the bottles were within a permissible level of haze.

A polyester resin container and the molding process thereof have been described with respect to examples. The PET bottle of this invention is a representative of such container, and can be used at a mold temperature above 210° C. in the double blow molding process and especially in the secondary blow molding step. It has also been described in this invention that said container can be well utilized obviously in the retort processing at a temperature range of 120° C. to about 130° C. and that it is possible to provide such a synthetic resin container.

Bottles are one embodiment of the containers to be used in the retort processing, and have a bottom in the shape of a so-called shallow-bowled champagne glass. As in the bottle 1 shown in FIG. 1, the bottom in this shape has been formed conventionally by caving in the bottom from the bottom plane to give a central concave portion 5a, while leaving an annular grounding bottom rim portion to surround this central concave portion 5a. However, if the bottles having the bottom in the shape of a shallow-bowled champagne glass are retort-processed under a severe temperature condition ranging from above 120° C. to about 130° C., especially by utilizing heating steam, it becomes necessary to treat the bottle thermally at a pressure near the saturated steam pressure at that temperature. In that case, no balance with the internal pressure of the bottles can be achieved, and the bottle inside is put under a pressurized condition. As a result, there may occur what is called the "bottom sag," whereby the bottom would expand downward and deform into a swollen state.

Upright standing stability is one of the most basic functions of bottles, and it is impaired by a minor change in the bottom, needless to add the large deformation into a reversed state. In the molding process of this invention which is concerned with the double blow molding process, it is thus necessary to pay attention to bottom deformation caused by retort processing from an aspect of container configurations.

Further reference is made here concerning the constructions of a bottle which makes it possible to control above-described bottom deformation in the retort processing even under a severe temperature condition in the range of above 120° C. to about 130° C. The first construction is concerned with body shape, and the second one, with bottom shape. If these constructions concerned with bottle configurations are combined with the molding process of this invention concerned with the double blow molding process, it is possible to provide a bottle that can be utilized reliably in the retort processing under a severe temperature condition in the range of above 120° C. to about 130° C.

The first construction is concerned with body shape, and preferably comprises that when bottles are retort-processed by steam at a temperature in the range of 120-130° C., the body wall can be deformed reversibly into a swollen state so that a differential pressure of 0.05 MPa or less, or preferably 0.03 MPa or less, is maintained between the inside of the bottle and the inside of a retort autoclave.

A basic idea in the above-described construction is that bottom deformation can be inhibited when the pressurized state created in the retort processing is eased up by an increase in the capacity derived from the deformation of body wall into a swollen state. Practically, the bottom deformation can be controlled to an extent to which the standing stability of the bottom would not be impaired, by setting a differential pressure of 0.05 MPa or less, or preferably 0.03 MPa or less, between the inside of the bottle and the inside of a retort autoclave in the case of retort processing at a temperature of 120-130° C.

In addition, the body can be given a noncircular cross-sectional shape by equipping the body with panels that can be reversed into a swollen state, or by using a body in an elliptical, somewhat flattened shape. When such a body is deformed into a circular shape, it is possible to increase the capacity as the cross-sectional area of the body is enlarged without permanent set caused by the drawn body wall. As regards restorableness of the body wall after retort processing, it will be suitable if the wall is rendered restorable in so far as the bottle keeps its good shape without any distorted deformation remaining. In this regard, however, some deformation, such as shrunk diameter of the body, is more or less inevitable when the PET resin bottles are processed at a high temperature in the range of 120-130° C.

The second construction is concerned with bottom shape, and preferably comprises the following constructive requirements (1) to (4):

(1) A bottom in a bottomed cylindrical shape is disposed under a body and comprises a heel portion which reaches ground plane, with diameter narrowing downward at a convex curvature radius, a grounding bottom rim portion in a ring shape disposed on the ground plane, and a central concave portion in a dome shape formed by caving in upward the ground plane from the grounding bottom rim portion.

(2) The outer diameter of the grounding bottom rim portion falls within a range of 55% to 85% of maximum diameter of the heel portion;

(3) The dome height of the central concave portion is set at a level corresponding to 35% or more of the outer diameter of the grounding bottom rim portion; and (4) A main arc shape of the central concave portion, i.e., the shape of an arc ranging from the base to the top of the dome, is determined by setting the concave curvature radius at a half (½) or more of the outer diameter of the grounding bottom rim portion.

The requirement (2) is concerned with the diameter of the annular grounding bottom rim portion serving as the base of the central concave portion. As long as the outer diameter is set at a length corresponding to 55% or more of the maximum diameter of the heel portion, the bottle maintains its standing stability and rarely falls down. If the grounding bottom rim portion has too large an outer diameter, then it is necessary to blow mold the heel portion in a deep-drawing manner. In that case, there arises a problem of locally thinned wall portions. Such a problem concerned with blow molding can be avoided by confining this diameter to 85% or less of the maximum diameter of the heel portion.

The constructive requirements (3) and (4) set the conditions for determining the dome shape of the central concave portion. Among them, the requirement (3) is concerned with the dome height. If the concave portion had a low height, then it would have a rather flat arc as a whole. When the bottle has been placed under a pressurized condition, the force acting on the dome outward along central axis would be relatively larger than the force acting in the lateral direction, and the cave-in deformation into a reversed state would tend to occur easily. If the dome height of the central concave portion is set at a level corresponding to 35% or more of the outer diameter of the grounding bottom rim portion, then the force acting in the lateral direction can be increased, the concave portion can be prevented from deformation into the reversed state, and is protected against deformation even under severe conditions experienced in the retort processing. (More preferably, the dome height is set at a level corresponding to 40% or more of the outer diameter.) The upper limit on the dome height can be suitably determined by taking into consideration the blow moldability, the shape and thickness of the grounding bottom rim portion, and the bottle capacity.

The requirement (4) is concerned with a curvature radius of a main arc shape, i.e., the shape of an arc ranging from near the base to near the dome top. If this curvature radius has too small a value, the concave portion cannot have a satisfactory dome height, inevitably resulting in a flat area near the dome top or a curved area having an outward curvature radius. Such an area would become a starting point from which the deformation in the reversed direction would proceed until finally the bottom sag takes place. If the concave curvature radius is set at a half (½) or more of the outer diameter of the grounding bottom rim portion under the requirement (4), then the entire central concave portion can have a steep curve for the dome and will never have a starting point from which the reversed deformation goes on and the bottom sag eventually develops.

As long as the requirements (2), (3), and (4) are fulfilled for the shape of the central concave portion including the diameter of the grounding bottom rim portion and the height and curvature radius of the dome, the central concave portion is protected against the deformation into a reversed state even under retort processing conditions, and a bottle having no bottom sag can be provided.

It is preferred that the width of the annular grounding bottom rim portion is set at 2 mm or less. This width can be determined while taking flow moldability into consideration although it is preferred that the rim portion is as narrow as a circular line from a stable contact point of view. If the grounding width is large, the concave portion tends to fall into the state of bottom sag, in which the concave portion within the rim portion sags down in the event of an increased internal pressure of the bottle. In that case, the bottle may not be able to maintain grounding stability. Thus, the grounding width is set at 2 mm or less, preferably 1 mm or less, so that the grounding bottom rim portion is prevented from sagging down. However, if the grounding rim portion has a narrower width, there is a fear that the bottom may become less shapable or blow moldable at the time of blow molding.

Figure 3:
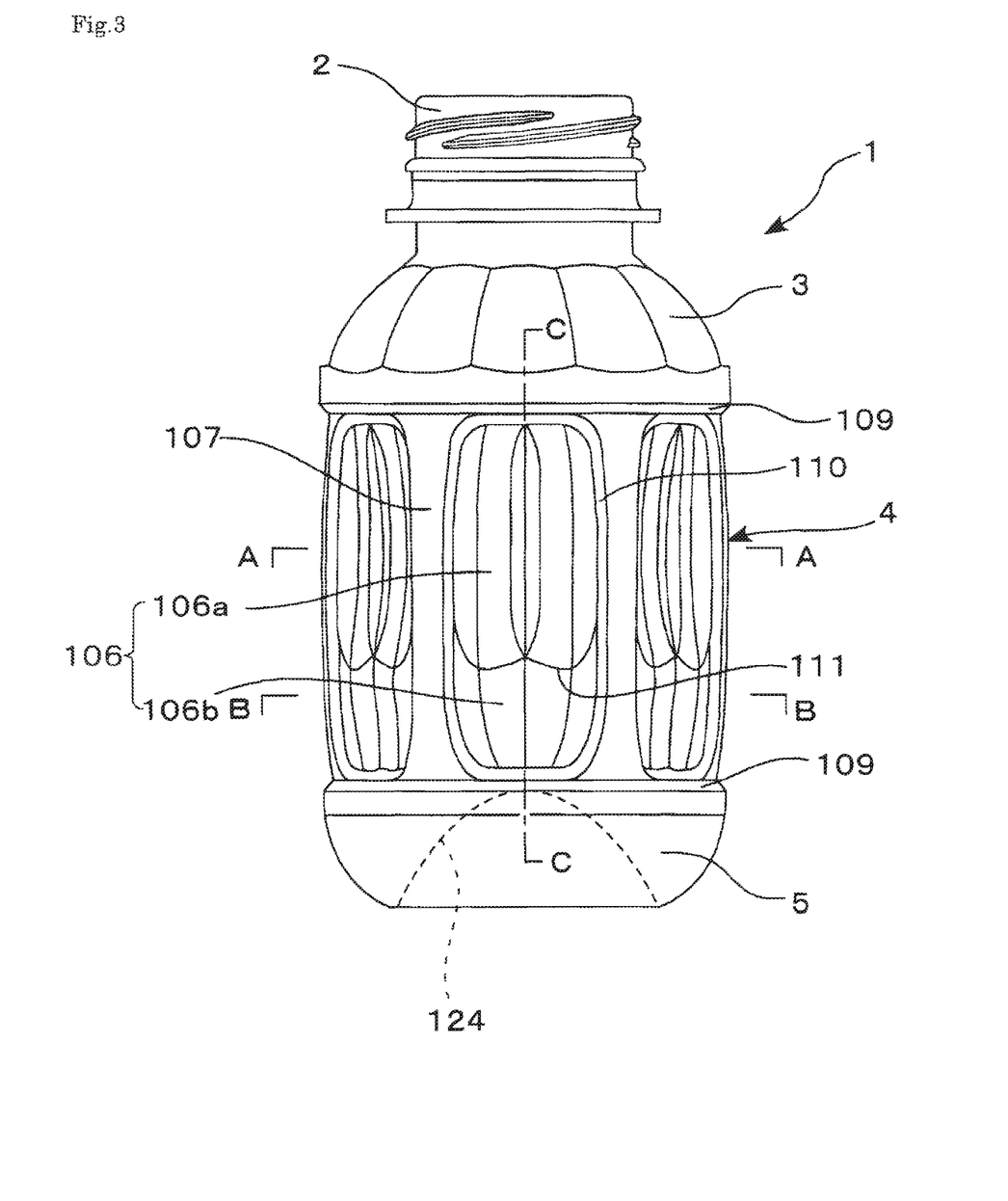
FIG. 3 is a front elevational view of the synthetic resin bottle in the second embodiment of this invention.
Figure 4:
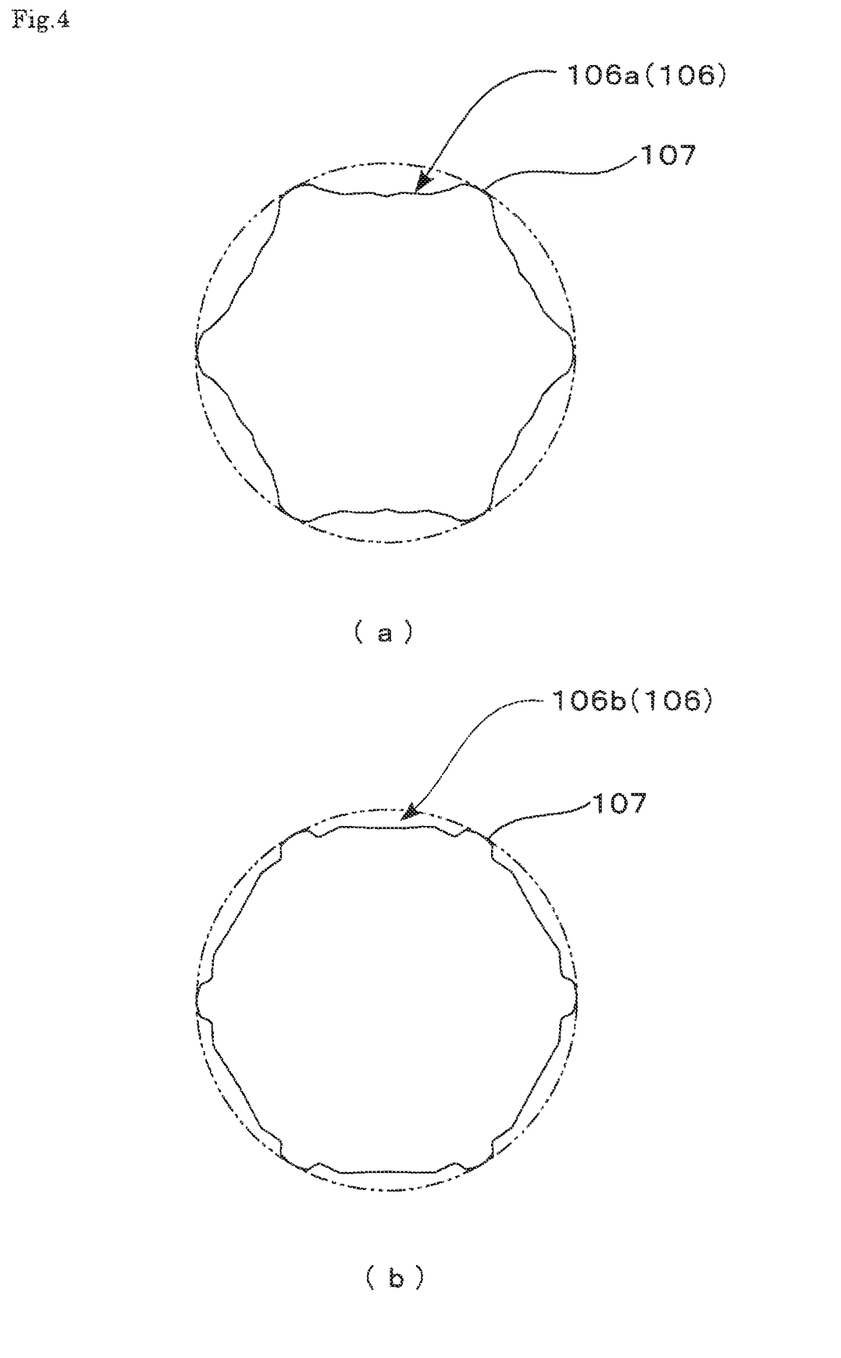

The above-described first construction concerning body shape and the second construction concerning bottom shape are further described with respect to the polyester container in a second embodiment of this invention, now referring to the drawings. FIGS. 3-6 show the synthetic resin bottle in the second embodiment of this invention. FIG. 3 is a front elevational view of the bottle. FIGS. 4(a) and 4(b) are cross-sectional outlines of the body taken from lines A-A and B-B, respectively, in FIG. 3. This bottle is a biaxially drawn, blow molded PET resin bottle, which has been molded by the double blow molding process under conditions listed in Example 1 of Table 1, and comprises a neck 2, a shoulder 3, a body 4, and a bottom 5. It is a small round bottle of 130 mm high and 66 mm in body diameter, with a capacity of 300 ml. The neck 2 is in a whitened state as a result of thermal crystallization treatment. The bottom 5 has a central concave portion 124 which is formed by caving in the central part of the bottom 5. Each chain double-dashed line in FIGS. 4(a) and 4(b) shows a circle to which the cross-sectional outline touches internally.

The body 4 has two peripheral-stepped portions 109 in its upper and lower areas. Six longitudinal panels 106 are formed in parallel between these upper and lower peripheral-stepped portions 109. Vertical rib-like pillars 107 are disposed between two adjacent panels 106, and these pillars 107 are left undented so that rigidity is secured over the entire bottle 1.

A stepped portion 110 surrounds each panel 106, which comprises a dented portion 106a in the upper area and a raised portion 106b in the lower area. A boundary line 111 divides the dented portion 106a from the raised portion 106b. The dented portion 106a and the raised portion 106b deform in cooperation with each other so as to be able to absorb the pressure fluctuations inside the bottle 1 that occur under a pressurized condition during retort processing and under a depressurized condition after cooling.

FIGS. 5(a) and 5(b) are explanatory diagrams showing deformation of a panel 106 (a dented portion 106a and a raised portion 106b) under pressurized and depressurized conditions. A chain double-dashed line in FIG. 5(a) shows a panel outline in its swollen state 115 under a pressurized condition during retort processing (i.e., a dented panel portion 115a in the swollen and reversed state and a raised panel portion 115b in the swollen state). Likewise, a chain double-dashed line in FIG. 5(b) shows a panel 106 in its dented state 116 under a depressurized condition caused by cooling the bottle after retort processing (i.e., the dented panel portion 106a in the dented state 116a and the raised panel portion 106b in the dented and reversed state 116b).

FIG. 6(a) is a vertical outline of the bottom area of the bottle 1 of FIG. 3; and FIG. 6(b), a bottom plan view. The bottom 5 generally in a shape of a bottomed cylinder is disposed under the body 4 and is provided with a heel portion 122 which reaches the ground plane 121, with the diameter narrowing downward at a convex curvature radius of R1. A grounding bottom rim portion 123 in a ring shape is disposed on the ground plane 121, and a central concave portion 124 in a dome shape is formed by caving in the bottom in and upward at a concave curvature radius of R2 over the range from the grounding bottom rim portion 123 to the top of the dome.

A portion ranging from base of the heel portion 122 to lower end of the central concave portion 124, with the grounding bottom rim portion 123 disposed in between, is formed by a small convex curvature radius of 1-4 mm except that the grounding bottom rim portion 123 is flat over its width W.

The bottom 5 of the bottle 1 in this example has the following dimensions:

| | |
|---|---|
| Width W of the grounding bottom rim portion 123: | 0.5 mm |
| Maximum diameter D1 of the heel portion 122: | 66 mm |
| Outer diameter D2 of the grounding bottom rim portion 123: | 45 mm |
| Height H1 of the central concave portion 124: | 19 mm |
| Curvature radius R1: | 21 mm |
| Curvature radius R2: | 27 mm |

From the above dimensions, the following results are obtained:

(1) The outer diameter D2 of the grounding bottom rim portion 123 accounts for 68% of the maximum diameter D1 of the heel portion 122, and falls within a range of 55% to 85% thereof.

(2) The dome height H1 of the central concave portion 124 accounts for 42% of the outer diameter of the grounding bottom rim portion 123, and is set at a level corresponding to 35% or more thereof.

(3) The curvature radius R2 of the central concave portion 13 accounts for 60% of the outer diameter D2 of the grounding bottom rim portion 123, and is set at a half (½) or more thereof.

Outline arrows in FIG. 6(a) show the force that acts on the central concave portion 124 under a pressurized condition. As illustrated in the figure, this force includes the one acting laterally and the other acting outward along the central axis of the bottle. If the force acting outward along the central axis increased relatively, the concave portion 124 would deform in the reverse direction, which starts from the dome top, and the bottom sag would takes place.

Bottom Deformation Test (Model Test)

A model test was conducted by using the above bottle 1 and following the procedure described below, to observe and measure any deformation which might occur when the pressure inside the bottle changed at a predetermined retort processing temperature.

1) Bottle Filling with Contents at a High Temperature

The bottles were filled with a mixture of glycerin and water at a mixing ratio in the range of 8:1 to 3:1 and at a temperature of 100° C. Each bottle was sealed with a cap. At that time, head space HS was set at 21 ml.

2) Dipping Test

The above bottles filled with mixed solutions were dipped in a glycerin solution at a temperature of 120-130° C. for 60 min. At a varied mixing ratio in the range of 8:1 to 3:1, and at a temperature of 120-130° C., there was a change in internal pressure over the range of 0.02 to 0.07 MPa as compared to external pressure (an atmospheric pressure of 0.101 MPa). In the description below, the pressure is expressed as a differential pressure as compared to the atmospheric pressure of 0.101 MPa.

3) Observation and Measurement of Bottom Deformation, if any, after the Test

The bottoms were cooled after the above-described test 2), and were then observed and measured, Results of the Model Test Following results were obtained from the above model test:

1) As shown in FIG. 5(a), the panels 106 of the body 4 deformed into a swollen state 115 when the internal pressure was set at 0.05 MPa or less over the temperature range of 120-130° C. After the test, the bottles were left to cool, and the panels 106 returned to the dented state 116 as shown in FIG. 5(b). There was no permanent deformation which might have disfigured the bottles as a result of swelling at a high temperature.

2) On the other hand, at an internal pressure higher than 0.05 MPa, the panels 106 of the body 4 was not only deformed into a swollen state 115, but also the bottom 5 significantly deformed into an expanded state, showing a sign of the so-called bottom sag and a decrease in the angle at which the bottle falls down. This bottle-falling angle is an angle of gradient at which the bottle falls from its standing posture and is measured by placing a bottle on a stand and inclining the stand gradually from the horizontal direction. This angle is used as an indication of bottle standing stability.

Retort Processing Test

Figure 7:
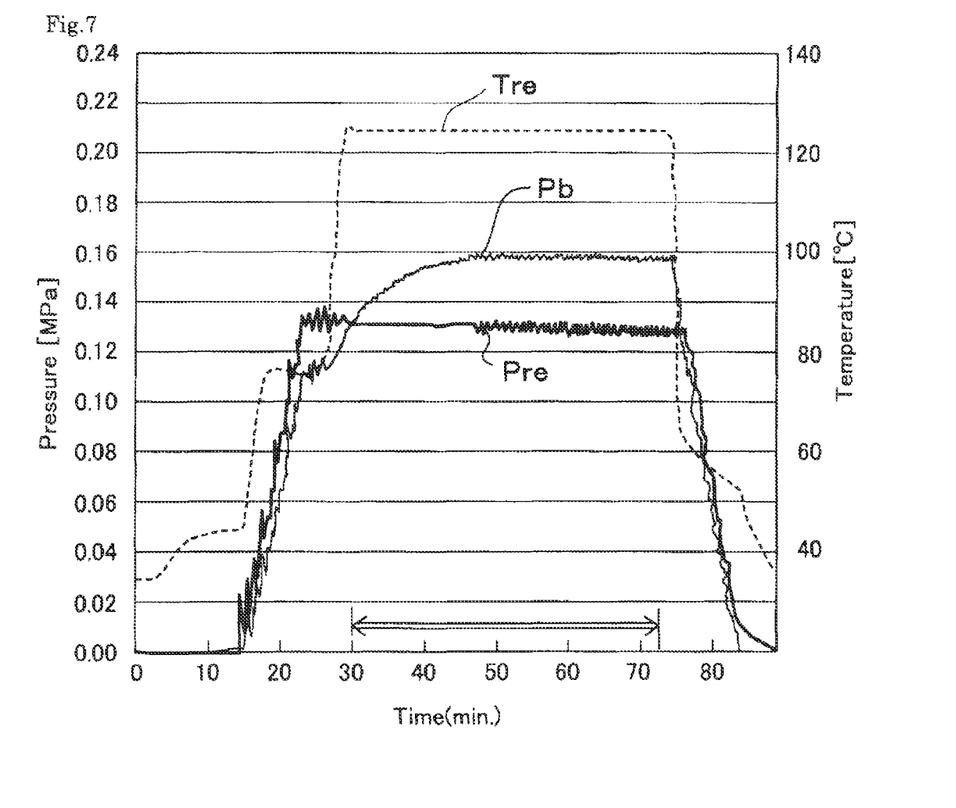
FIG. 7 is a graph showing the changes in temperature and pressure during the retort processing test.

A retort processing test was conducted to confirm the above model test results. The bottles 1 in the second embodiment shown in FIG. 3 were filled with water at a temperature of 90° C., while securing head space amounting to 21 ml. The bottles were retort-processed by steam at a temperature of 124° C. for 42 min (a time span illustrated by an outline arrow in the graph of FIG. 7). FIG. 7 is a graph showing changes in temperature and pressure during the retort processing test. In the graph, Tre and Pre are temperature and pressure, respectively, inside the retort autoclave. Pb is a pressure inside the bottle. The pressure in the retort autoclave was 0.130 MPa when the retort autoclave temperature Tre was set at a steady temperature of 124° C. The internal pressure of the bottle was 0.159 MPa, and thus, the differential pressure was 0.029 MPa. The above-described temperature of 124° C. and the period of 42 min are the conditions corresponding to those utilized for the sterilization of soup and the like.

Figure 5:
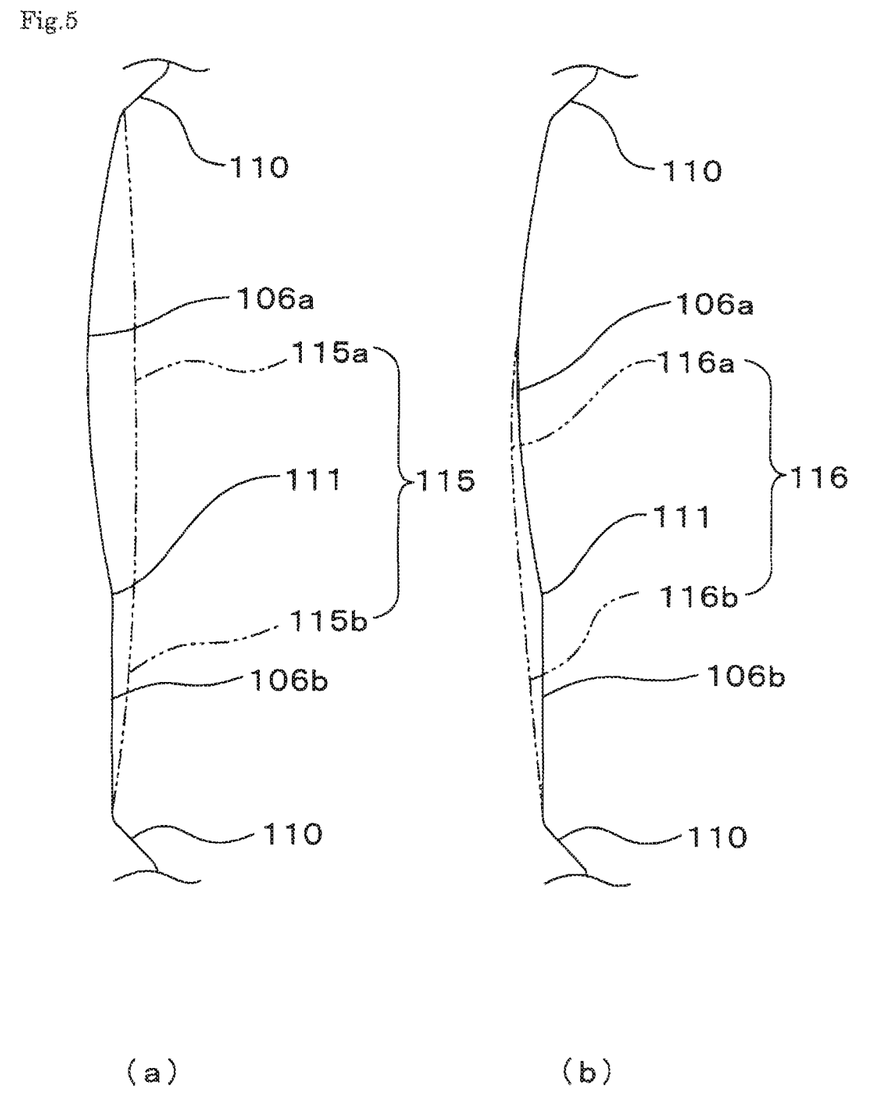
FIG. 5 are explanatory diagrams showing vertical outlines of a panel in (a) the swollen state and (b) the dented state (3$b$), taken from line C-C of the bottle of FIG. 3.
Figure 6:
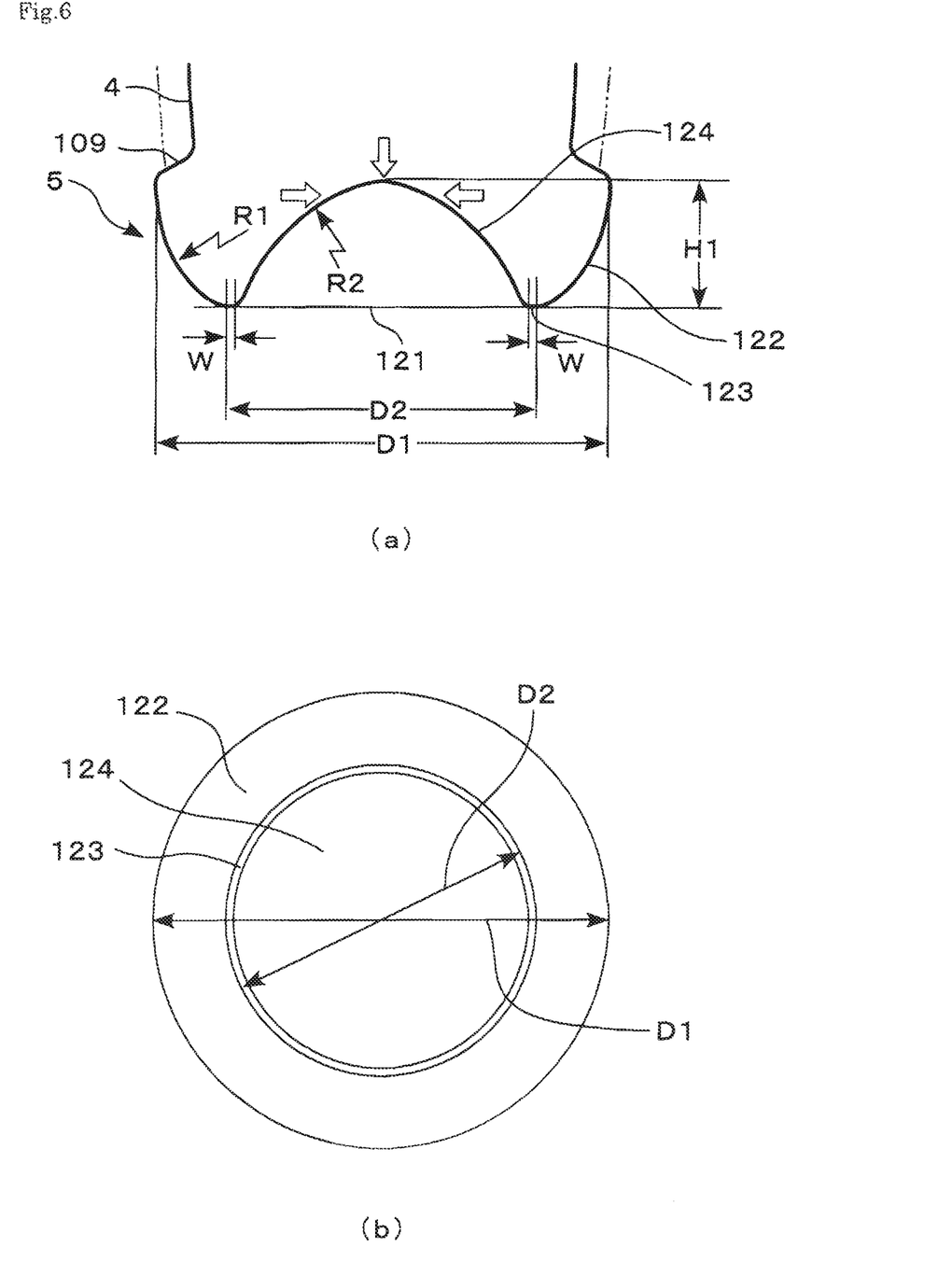

After the test, the falling angle showed little change as compared to the angle before the test. The grounding bottom rim portion 123 had an outer diameter D of 42 mm, and the central concave portion 124 had a height H1 of 16 mm, which accounted for 91% and 89%, respectively, of the dimensions before the test. The shrinkage of the outer diameter D of the grounding bottom rim portion 123 and of the cave-in height H1 is considered as thermal shrinkage caused by the crystallization going on at 124° C. However, since the shrinking deformation proceeds evenly, there is no problem in the shrinkage from a practical point of view. As regards the body 4, the panels 106 restored their dented position 116 in FIG. 5(*b*) after the bottle was left to cool. Thus, there was no permanent deformation that would impair the bottle shape due to the swelling at a high temperature.

INDUSTRIAL APPLICABILITY

The polyester container of this invention is a nonconventional container having so high a heat resisting property as to be usable in the retort processing even at a temperature ranging from above 120° C. to about 130° C. Since this container is usable at a high retort-processing temperature, the container is likely to have high productivity and improved product quality. As such, the container of this invention is expected to find wide use applications in the field of retort foods.

The invention claimed is:

1. A polyester resin container made by a double blow molding process, wherein the double blow molding process comprises:
    a primary blow molding step in which a preform is biaxially drawn and blow molded into a primary intermediate product,
    a thermally shrink-molding step in which the primary intermediate product is heated and forcibly shrink-molded into a secondary intermediate product, and
    a secondary blow molding step for blow molding the secondary intermediate product into a container, wherein
        a mold temperature higher than 210° C. is used in the secondary blow molding step, and
        the container exhibits a volume shrinkage ratio of 0.75% or less when retort processed at 124° C. for 42 minutes.

2. The polyester resin container according to claim 1 wherein the polyester resin is of a polyethylene terephthalate series.

* * * * *